(12) United States Patent
Weiss

(10) Patent No.: US 8,443,526 B2
(45) Date of Patent: May 21, 2013

(54) ROBOT COMPLIANCE DEVICE

(75) Inventor: Kevin B. Weiss, Stillwater, MN (US)

(73) Assignee: Nexen Group, Inc., Vadnasi Heights, MN (US)

( * ) Notice: Subject to any disclaimer, the term of this patent is extended or adjusted under 35 U.S.C. 154(b) by 819 days.

(21) Appl. No.: 12/613,401

(22) Filed: Nov. 5, 2009

(65) Prior Publication Data

US 2010/0107801 A1     May 6, 2010

Related U.S. Application Data

(60) Provisional application No. 61/111,474, filed on Nov. 5, 2008.

(51) Int. Cl.
*G01B 5/25* (2006.01)
*B25J 17/02* (2006.01)

(52) U.S. Cl.
USPC .................................. 33/645; 33/520; 901/45

(58) Field of Classification Search
USPC ........................................ 33/644, 520; 901/45
See application file for complete search history.

(56) References Cited

U.S. PATENT DOCUMENTS

| | | | | |
|---|---|---|---|---|
| 3,824,674 A | | 7/1974 | Inoyama et al. | ................. 29/407 |
| 4,098,001 A | | 7/1978 | Watson | ............................ 33/169 |
| 4,155,169 A | * | 5/1979 | Drake et al. | ..................... 33/644 |
| 4,283,153 A | * | 8/1981 | Brendamour | ................... 403/53 |
| 4,379,363 A | * | 4/1983 | Whitney | ........................... 33/644 |
| 4,627,169 A | | 12/1986 | Zafred et al. | ..................... 33/169 |
| 4,718,798 A | | 1/1988 | Dumargue et al. | ............. 409/97 |
| 4,720,923 A | | 1/1988 | Quinton et al. | .................. 33/644 |
| 4,818,174 A | | 4/1989 | Arpiarian et al. | ............. 414/735 |
| 4,848,757 A | | 7/1989 | De Fazio | ........................ 267/150 |
| 4,897,930 A | | 2/1990 | Cusack | ............................ 33/644 |
| 5,207,554 A | | 5/1993 | Asakawa et al. | ........... 414/744.6 |
| 5,396,714 A | | 3/1995 | Sturges, Jr. et al. | ............. 33/644 |
| 5,420,489 A | * | 5/1995 | Hansen et al. | ........... 318/568.18 |
| 5,836,083 A | | 11/1998 | Sangwan | ......................... 33/644 |

(Continued)

FOREIGN PATENT DOCUMENTS

| | | |
|---|---|---|
| DE | 10010804 | 9/2002 |
| FR | 2561973 | 10/1985 |

(Continued)

OTHER PUBLICATIONS

R+W® Coupling Technology, Linear Couplings Series LK 70-2,000N, 2 pages.

*Primary Examiner* — R. A. Smith
(74) *Attorney, Agent, or Firm* — Alan Kamrath; Kamrath IP Lawfirm, P.A.

(57) ABSTRACT

A robot compliance device includes first and second discs (12, 30) spaced along a first axis (X). A column (24) is interconnected between the first disc (12) and a beam (14) intermediate the first and second discs (12, 30). A compliance member (40) is mounted around the column (24) between the first disc (12) and the beam (14). First and second canted resilient plates (50) are interconnected between the compliance member (40) and the beam (14) and spaced from each other along a second axis (Y) perpendicular to the first axis (X) and are at a first acute angle with and spaced from the first axis (X). Third and fourth canted resilient plates (52) are interconnected between the second disc (30) and the compliance member (40) and spaced from each other along a third axis (Z) perpendicular to the first and second axes (X, Y) and are at a second acute angle with and spaced from the first axis (X).

20 Claims, 6 Drawing Sheets

U.S. PATENT DOCUMENTS

| | | | | |
|---|---|---|---|---|
| 5,909,941 A * | 6/1999 | Cheng et al. | | 33/644 |
| 6,021,579 A | 2/2000 | Schimmels et al. | | 33/645 |
| 6,408,531 B1 | 6/2002 | Schimmels | | 33/644 |
| 6,473,985 B2 | 11/2002 | Won et al. | | 36/644 |
| 6,792,689 B2 | 9/2004 | Joo | | 33/644 |
| 7,284,459 B2 * | 10/2007 | Bellouard | | 74/490.01 |

FOREIGN PATENT DOCUMENTS

| | | | |
|---|---|---|---|
| GB | 2 152 473 A | | 8/1985 |
| GB | 2189458 A | * | 10/1987 |
| JP | 61019566 A | * | 1/1986 |

* cited by examiner

ROBOT COMPLIANCE DEVICE

BACKGROUND OF THE INVENTION

The present invention relates to a robot compliance device and, more particularly, to a robot compliance device that has a simple structure and that can avoid undesired angular misalignment during operation.

Robots are widely utilized in many industries for various purposes. In one application, robots are utilized to assemble a first part such as a precise shaft, a pin, or a bearing into a hole of a second part. Many compliance devices have been developed to compensate misalignment between axes of the first and second parts due to machine inaccuracy, vibration, or tolerance during assembly. A typical compliance device generally includes an upper plate attached to a bracket of a robot, a lower plate carrying the first part, and a plurality of elastic bodies between the upper and lower plates. When the first part is subjected to a reactive force resulting from the misalignment between the axes of the first and second parts, the elastic bodies are compressed and/or twisted and translate in a direction perpendicular to the axis of the second part to bring the axis of the first part toward the axis of the second part. However, the elastic bodies may bend in an undesired manner as a result of a large insertion force required in assembly. As a result, assembly can not be performed properly, since the first part held by the lower plate is liable to be inclined due to undesired angular misalignment between the axes resulting from compression of the elastic bodies along the axis of the first part. In an approach to solve the problem resulting from the large insertion force, a plurality of rigid limiters are mounted between the lower plate and the bracket of the robot and extended through the upper plate. The limiters come in contact with the bracket after the lower plate has been moved toward the upper plate through a predetermined travel, limiting further travel of the lower plate to prevent undesired bending of and/or damage to the elastic bodies. However, undesired angular misalignment still exists during assembly, for the elastic bodies are still compressed along the axis of the first part. Aside from the above problems, the above compliance devices suffer from the common disadvantages including but not limited to being expensive, having complicated structures and having limited applications such as limited working force ranges.

Thus, a need exists for a robot compliance device that has a simple structure and that can be easily modified according to needs while providing desired spherical compliance.

BRIEF SUMMARY OF THE INVENTION

The present invention solves this need and other problems in the field of compensation of misalignment of two parts to be assembled together by providing, in a preferred form, a robot compliance device including first and second discs spaced from each other along a first axis. One of the first and second discs is adapted to be fixed to an arm of a robot, and the other of the first and second discs is adapted to couple with an object having an object axis to be inserted into a workpiece having a workpiece axis. A beam is intermediate the first and second discs. A column is interconnected between the first disc and the beam and extends along the first axis. A compliance member is mounted around the column between the first disc and the beam. The compliance member is moveable relative to the column. First and second canted resilient plates are interconnected between the compliance member and the beam. The first and second canted resilient plates are at a first acute angle with and spaced from the first axis. The column is intermediate the first and second canted resilient plates. The first and second canted resilient plates are spaced from each other along a second axis perpendicular to the first axis. Third and fourth canted resilient plates are interconnected between the second disc and the compliance member. The third and fourth canted resilient plates are at a second acute angle, most preferably equal to the first acute angle, with and spaced from the first axis. The column is intermediate the third and fourth canted resilient plates. The third and fourth canted resilient plates are spaced from each other along a third axis perpendicular to the first and second axes.

When one of the first and second discs is subjected to a force acting in a direction not coincident to the first axis resulting from misalignment of the object axis and the workpiece axis during insertion of the object into the workpiece, the first and second canted resilient plates deform along the second axis with the compliance member moving along the second axis responsive to the deforming of the first and second canted resilient plates, and the third and fourth canted resilient plates deform along the third axis with the compliance member moving along the third axis responsive to the deforming of the third and fourth canted resilient plates, with the compliance member moving relative to the first axis and with the object rotating about an object center of compliance during insertion of the object into the workpiece.

In the most preferred form, the compliance member is cross-shaped and includes a first section extending along the second axis and a second section extending along the third axis and intersecting the first section at a compliance center of the compliance member. The compliance member includes a central hole in the compliance center. The central hole includes an inner periphery having circular cross sections in the most preferred form. The column extends through the central hole and is spaced from the inner periphery of the central hole in an unstressed condition. Furthermore, the second disc includes a groove formed in an inner face thereof and extending along the second axis. The beam is mounted in the groove and extends along the second axis. The beam includes parallel, spaced, first and second sides each of which is generally parallel to and spaced from one of two sidewalls of the groove in an unstressed condition, so that the sidewalls of the groove limit movement of the beam in the groove along the third axis. The first canted resilient plate is interconnected between an end of the beam and an end of the first section of the compliance member. The second canted resilient plate is interconnected between the other end of the beam and the other end of the first section of the compliance member. The third canted resilient plate is interconnected between the inner face of the second disc and an end of the second section of the compliance member. The fourth canted resilient plate is interconnected between the inner face of the second disc and the other end of the second section of the compliance member. The third and fourth canted resilient plates are on opposite sides of the groove.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
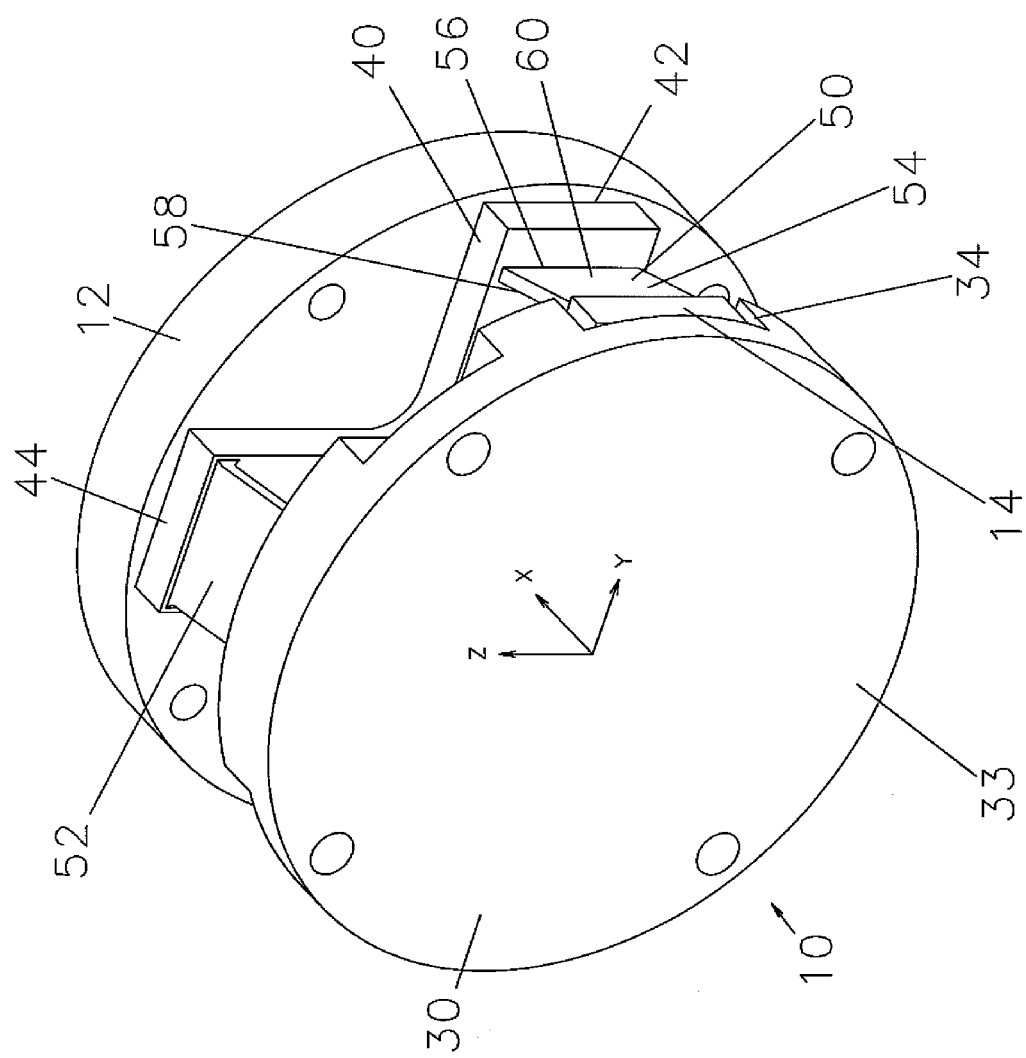
FIG. 1 shows a perspective view of a robot compliance device according to the preferred teachings of the present invention.
Figure 2:
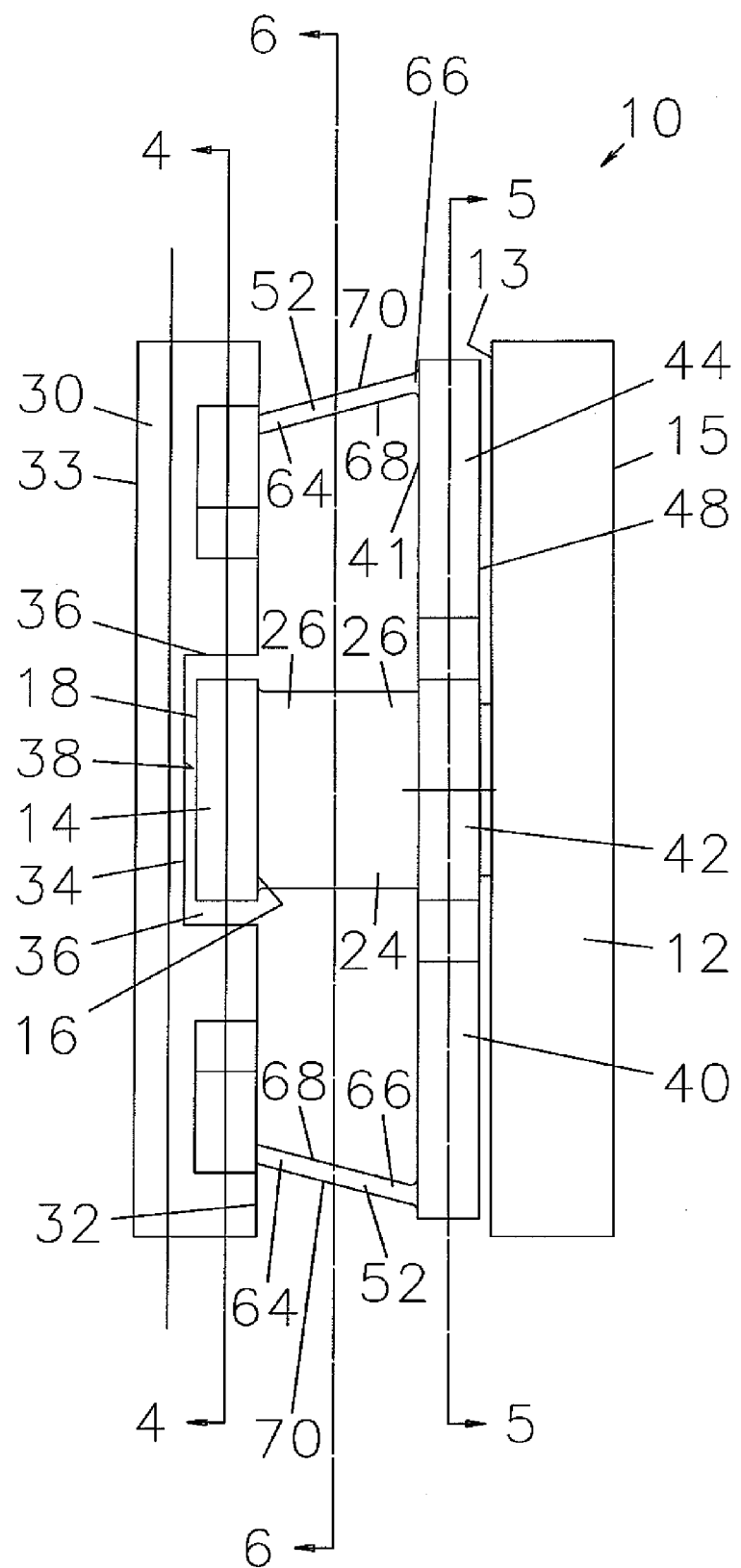
FIG. 2 shows a side, elevational view of the robot compliance device of FIG. 1.
Figure 3:
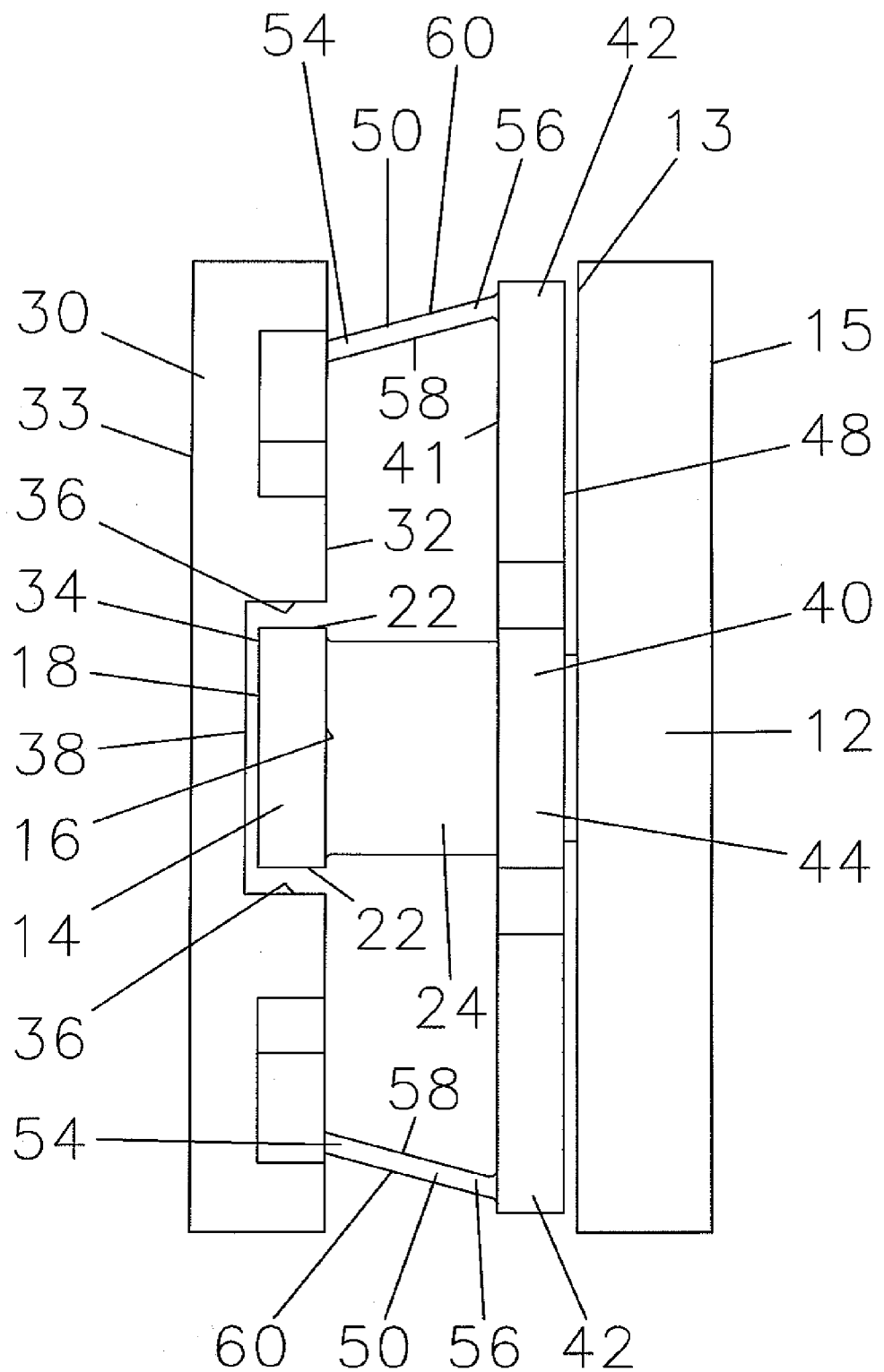
FIG. 3 shows a front view of the robot compliance device of FIG. 1.
Figure 4:
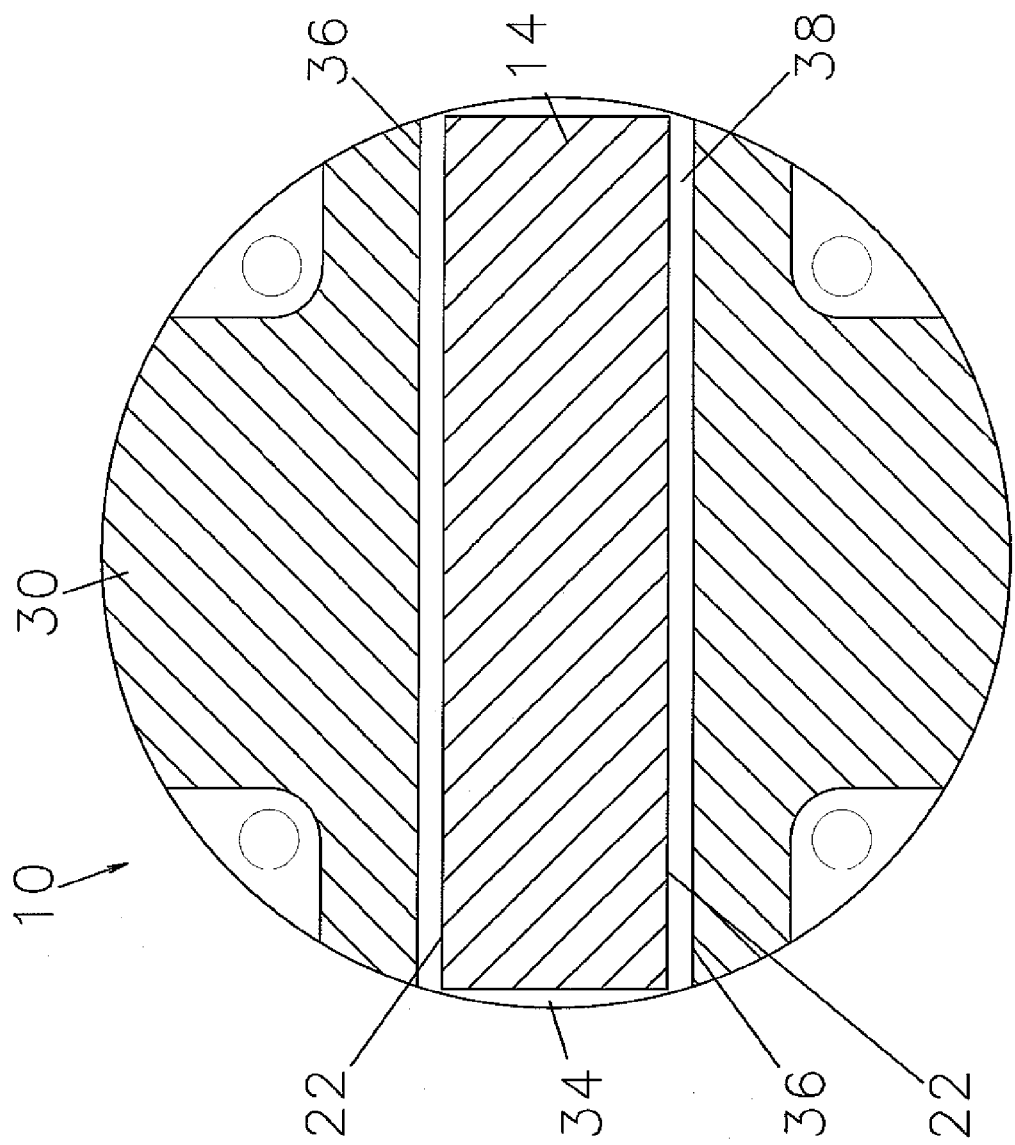
FIG. 4 shows a cross sectional view of the robot compliance device of FIG. 1 according to section line 4-4 of FIG. 2.
Figure 5:
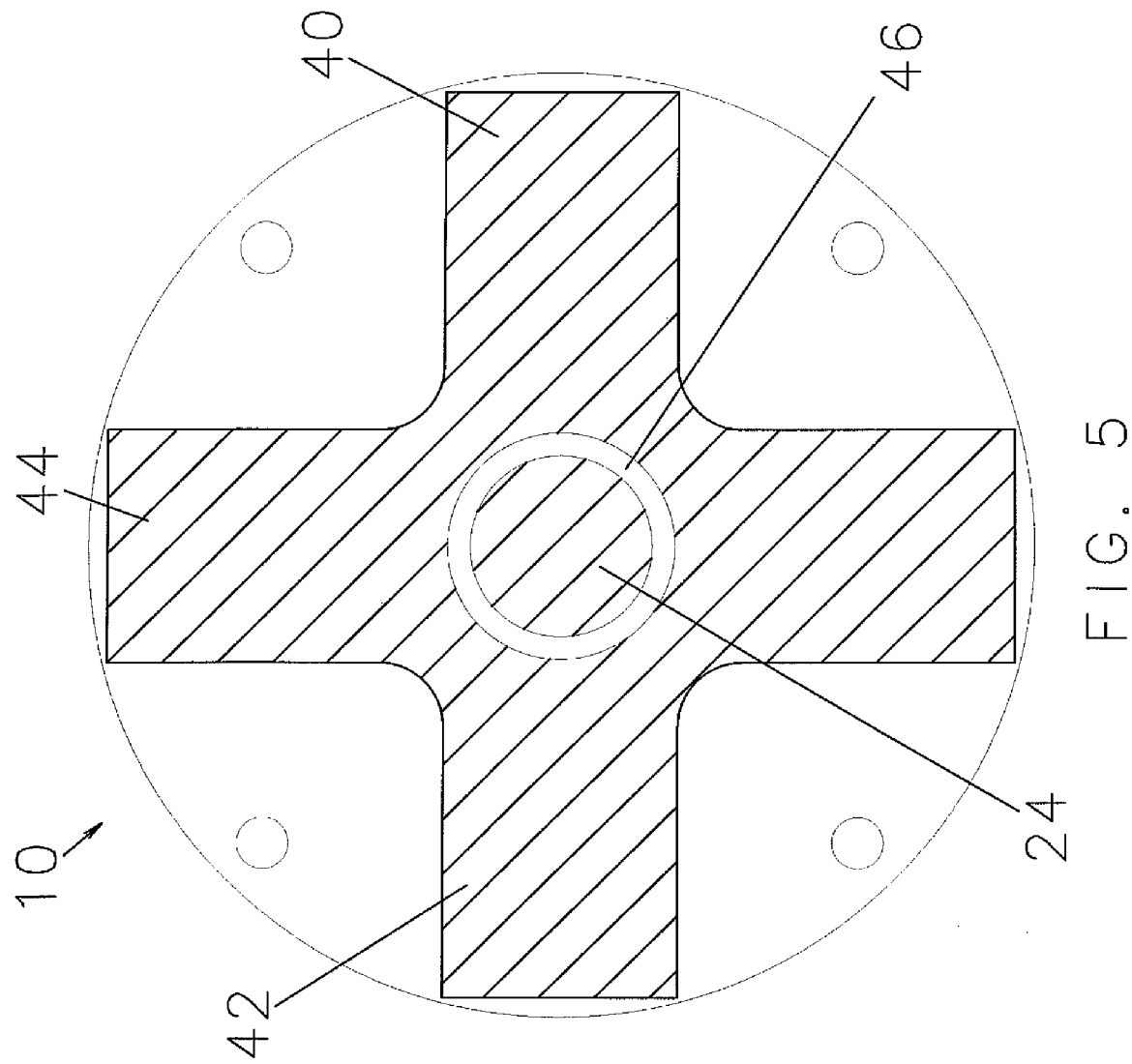
FIG. 5 shows a cross sectional view of the robot compliance device of FIG. 1 according to section line 5-5 of FIG. 2.
Figure 6:
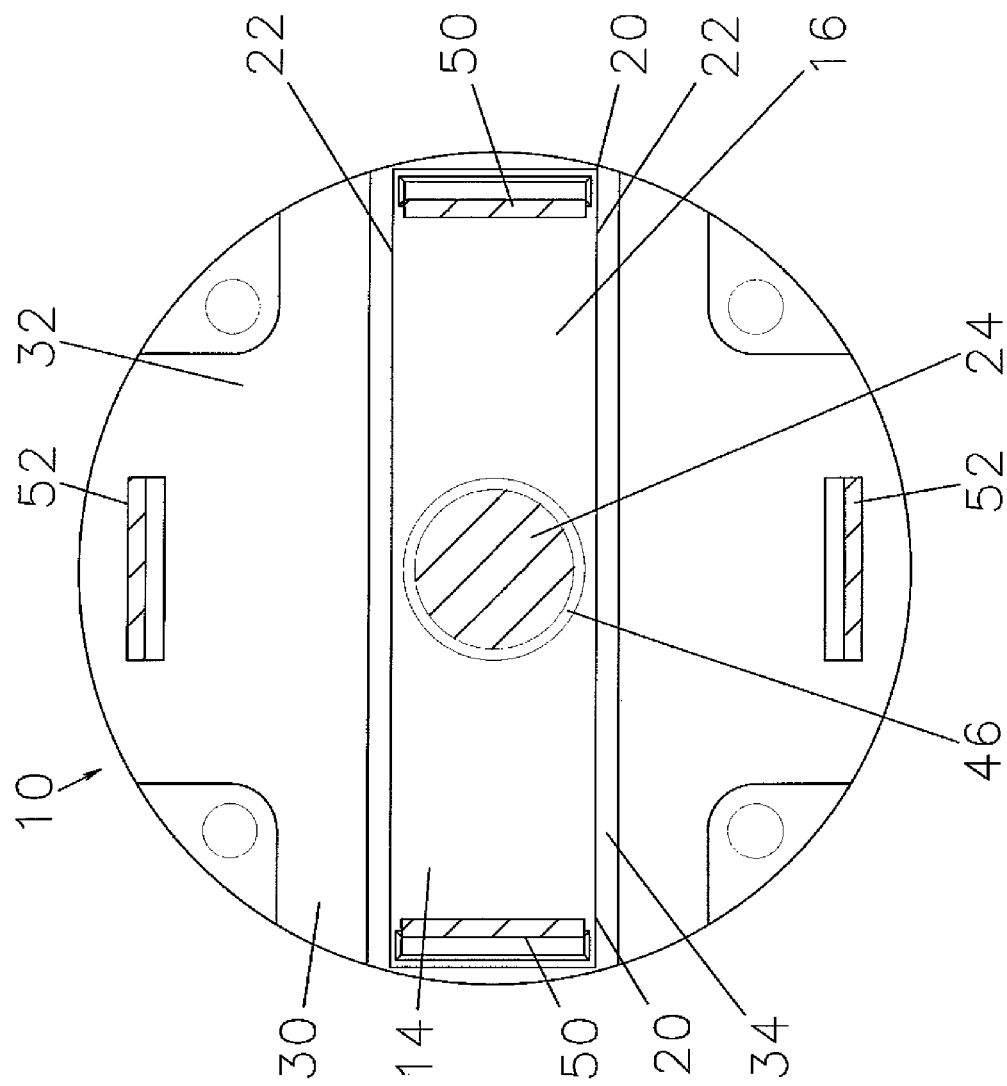
FIG. 6 shows a cross sectional view of the robot compliance device of FIG. 1 according to section line 6-6 of FIG. 2.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "inner", "outer", "end", "portion", "section", "circumferential", "longitudinal", "spacing", "length", "width", "thickness", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENTS

A robot compliance device according to the preferred teachings of the present invention is shown in the drawings and generally designated 10. According to the preferred form shown, robot compliance device 10 includes a first disc 12 that has an inner face 13 and an outer face 15 parallel to and spaced from inner face 13 along a first axis X. First disc 12 has circular cross sections between inner face 13 and outer face 15.

A beam 14 in the most preferred form shown as a right parallelepiped is spaced from inner face 13 of first disc 12 along first axis X. Specifically, beam 14 includes an inner surface 16 facing inner face 13 of first disc 12 and parallel to and spaced from inner face 13 of first disc 12 along first axis X. Beam 14 further includes an outer surface 18 parallel to and spaced from inner surface 16 along first axis X and facing away from first disc 12. Beam 14 further includes first and second ends 20 spaced along a second axis Y perpendicular to first axis X and extending between inner and outer surfaces 16 and 18. In the preferred form shown, first and second ends 20 are distant to and on opposite sides of first axis X. Beam 14 further includes parallel, first and second sides 22 spaced from each other along a third axis Z perpendicular to first and second axes X and Y and extending between inner and outer surfaces 16 and 18.

A column 24 is interconnected between inner face 13 of first disc 12 and inner surface 16 of beam 14 and extends along first axis X. According to the most preferred form shown, column 24 includes two ends 26 respectively interconnected to centers of inner face 13 of first disc 12 and inner surface 16 of beam 14. Column 24 in the most preferred form includes circular cross sections between ends 26 and a longitudinal axis coincident to first axis X. Furthermore, first disc 12, beam 14, and column 24 are made of rigid material and coupled together such as by welding or other suitable provisions to prevent relative movement therebetween.

According to the preferred form shown, robot compliance device 10 further includes a second disc 30 spaced from inner face 13 of first disc 12 along first axis X. Specifically, second disc 30 includes an inner face 32 facing first disc 12 and parallel to and spaced from inner face 13 of first disc 12 along first axis X. Beam 14 is intermediate first and second discs 12 and 30. Second disc 30 further includes an outer face 33 parallel to and spaced from inner face 32 along first axis X and facing away from beam 14. Second disc 30 has circular cross sections between inner and outer faces 32 and 33. Inner face 32 of second disc 30 includes a groove 34 extending along second axis Y. Groove 34 includes first and second, parallel sidewalls 36 spaced from each other along third axis Z. Groove 34 further includes a bottom wall 38 interconnected between first and second sidewalls 36. Beam 14 is received in groove 34 and moveable in a plane containing second and third axes Y and Z. Outer surface 18 of beam 14 is generally parallel to and spaced from bottom wall 38 of groove 34 along first axis X in an unstressed condition. First side 22 of beam 14 is generally parallel to and spaced from first sidewall 36 of groove 34 along third axis Z in the unstressed condition. Second side 22 of beam 14 is generally parallel to and spaced from second sidewall 36 of groove 34 along third axis Z in the unstressed condition.

According to the preferred form shown, robot compliance device 10 further includes a compliance member 40 mounted around column 24 between first disc 12 and beam 14. According to the most preferred form shown, compliance member 40 is cross-shaped and includes an inner wall 41 generally parallel to and spaced from inner face 13 of first disc 12 along first axis X in an unstressed condition. Compliance member 40 further includes an outer wall 48 parallel to and spaced from inner wall 41 along first axis X and generally parallel to and spaced from inner face 13 of first disc 12 along first axis X in the unstressed condition. Outer wall 48 of compliance member 40 is intermediate inner face 13 of first disc 12 and inner wall 41 of compliance member 40. Furthermore, inner face 32 of second disc 30 is intermediate outer face 33 of second disc 30 and inner wall 41 of compliance member 40. Further, compliance member 40 includes a first section 42 and a second section 44 perpendicular to first section 42 and intersecting first section 42 at a compliance center of compliance member 40. Specifically, first section 42 extends along second axis Y and includes two ends on opposite sides of the compliance center. Second section 44 extends along third axis Z and includes two ends on opposite sides of the compliance center. In the preferred form shown, first section 42 has a constant length along second axis Y equal to that of beam 14 along second axis Y and to that of second section 44 along third axis Z. Furthermore, first section 42 has a constant width along third axis Z equal to that of beam 14 and equal to that of second section 44 along second axis Y. Further, first section 42 has a constant thickness along first axis X equal to that of second section 44 along first axis X. The thicknesses of first and second sections 42 and 44 are considerably smaller than the heights and widths of first and second sections 42 and 44. Furthermore, compliance member 40 includes a central hole 46 in the compliance center through which first axis X extends. Central hole 46 includes an inner periphery corresponding to the cross sections of column 24 and preferably having circular cross sections in the preferred form shown. Column 24 extends through central hole 46 and is spaced from the circular inner periphery of central hole 46 in an unstressed condition so that compliance member 40 can move relative to column 24. According to the most preferred form shown, column 24 in the unstressed condition includes an outer periphery having an identical spacing to the circular inner periphery of central hole 46 in a circumferential direction surrounding first axis X.

According to the preferred form shown, robot compliance device 10 further includes first and second canted resilient plates 50 interconnected between beam 14 and first section 42 of compliance member 40. Specifically, each of first canted resilient plate 50 includes first and second ends 54 and 56 and inner and outer inclined surfaces 58 and 60 extending between first and second ends 54 and 56. Inner and outer inclined surfaces 58 and 60 are parallel to and spaced from each other along second axis Y. Inner inclined surfaces 58 face column 24 that is intermediate first and second resilient plates 50, and outer inclined surfaces 60 face away from column 24. First end 54 of first canted resilient plate 50 is interconnected to an end of inner surface 16 of beam 14. Second end 56 of first canted resilient plate 50 is interconnected to an end of first section 42 of compliance member 40. First end 54 of second canted resilient plate 50 is interconnected between the other end of inner surface 16 of beam 14. Second end 56 of second canted resilient plate 50 is interconnected to the other end of first section 42 of compliance member 40. In the most preferred form shown, each of inner and outer inclined surfaces 58 and 60 of each of first and second canted resilient plates 50 is at a first acute angle with and spaced from first axis X and in the most preferred form shown are equal and in the order of 15°. First canted resilient plate 50 has a length between inner surface 16 of beam 14 and compliance member 40 equal to that of second canted resilient plate 50 between inner surface 16 of beam 14 and compliance member 40. Furthermore, first and second canted resilient plates 50 are spaced from each other along second axis Y. First and second canted resilient plates 50 have increasing spacings between inner inclined surfaces 58 along second axis Y toward compliance member 40. First and second canted resilient plates 50 can be manufactured from a number of materials with well understood spring response to allow changes according to needs in different applications.

According to the preferred form shown, robot compliance device 10 further includes third and fourth canted resilient plates 52 interconnected between second disc 30 and second section 44 of compliance member 40. Specifically, each of third and fourth canted resilient plates 52 includes first and second ends 64 and 66 and inner and outer inclined surfaces 68 and 70 extending between first and second ends 64 and 66. Inner and outer inclined surfaces 68 and 70 are parallel to and spaced from each other along third axis Z. Inner inclined surfaces 68 face column 24 that is intermediate third and fourth canted resilient plates 52, and outer inclined surfaces 70 face away from column 24. First end 64 of third canted resilient plate 52 is interconnected to inner face 32 of second disc 30. Second end 66 of third canted resilient plate 52 is interconnected to an end of second section 44 of compliance member 40. First end 64 of fourth canted resilient plate 52 is interconnected to inner face 32 of second disc 30. Second end 66 of fourth canted resilient plate 52 is interconnected to the other end of second section 44 of compliance member 40. In the most preferred form shown, each of inner and outer inclined surfaces 68 and 70 of each of third and fourth resilient canted plates 52 is at a second acute angle with and spaced from first axis X and in the most preferred form shown are equal and in the order of 15°. According to the most preferred form shown, the first acute angle is equal to the second acute angle. In the preferred form shown, third canted resilient plate 52 has a length between inner face 32 of second disc 30 and compliance member 40 equal to that of fourth canted resilient plate 52 between inner face 32 of second disc 30 and compliance member 40 and equal to the lengths of first and second canted resilient plates 50. Furthermore, third and fourth canted resilient plates 52 are spaced from each other along third axis Z. Third and fourth canted resilient plates 52 have increasing spacings between inner inclined surfaces 68 along third axis Z toward compliance member 40. Further, third and fourth canted resilient beams 52 are on opposite sides of groove 34. According to the most preferred form shown in an unstressed condition, a spacing increment of the spacings between third and fourth canted resilient plates 52 toward compliance member 40 along first axis X is equal to that of the spacings between first and second canted resilient plates 50 toward compliance member 40 along first axis X. Furthermore, first, second, third, and fourth canted resilient plates 50 and 52 have a geometric center located on first axis X. Third and fourth canted resilient plates 52 can be manufactured from a number of materials with well understood spring response to allow changes according to needs in different applications and in the preferred form are made from the same material as first and second canted resilient plates 50.

Now that the basic construction of robot compliance device 10 of the preferred teachings of the present invention has been explained, the operation and some of the advantages of robot compliance device 10 can be set forth and appreciated. In particular, for the sake of explanation, it will be assumed that first disc 12 is fixed to an arm of a robot, and second disc 30 is coupled with a holding device that securely holds an object such as a precise shaft, a pin, or a bearing to be inserted into a hole such as a shaft hole, a pin hole, or a bearing hole in a workpiece. The holding device and the arm of the robot can be of any desired forms as conventional including but not limited to of commercially available types. The object includes an object axis that is coincident to first axis X of robot compliance device 10. The robot applies an insertion force to insert the object into the hole of the workpiece. When the object axis is not coincident to the workpiece axis due to machine inaccuracy, vibration, tolerance, etc. during insertion of the object into the workpiece, second disc 30 is subjected to a reactive force acting in a direction not coincident to first axis X when the object comes in contact with an angled portion of the hole of the workpiece. The reactive force includes a first component and a second component perpendicular to the first component. The first component causes translation of robot compliance device 10 carrying the object in a direction toward a workpiece axis of the hole of the workpiece. The second component acts on second disc 30 along an axis parallel to and spaced from the object axis that is coincident to first axis X of robot compliance device 10. First and second canted resilient plates 50 deform along second axis Y with compliance member 40 moving along second axis Y responsive to the deforming of first and second canted resilient plates 50. Furthermore, third and fourth resilient plates 52 deform along third axis Z with compliance member 40 moving along third axis Z responsive to the deforming of third and fourth canted resilient plates 52. Furthermore, canting of first, second, third, and fourth canted resilient beams 50 and 52 allows a small, angular deflection of compliance member 40 relative to first axis X. Specifically, first, second, third, and fourth canted resilient beams 50 and 52 cause a spherical compliance response at an object center of compliance that is known as the remote center of compliance (RCC) where the object remains centered and rotates about during insertion of the object into the workpiece. Thus, the object is moved into the hole of the workpiece when the robot keeps applying the insertion force. Rotation of the object about the RCC assures insertion of the object into the workpiece even if angular tolerance arises in manufacturing. In the most preferred form shown, the RCC is intermediate the geometric center of first, second, third, and fourth canted resilient plates 50 and 52 and the compliance center of compliance member 40 along first axis X. It is noted that first and second sidewalls 36 of groove 34 limit movement of beam 14 in groove 34 along third axis Z. Although the compliance motion of robot compliance device 10 is spherical, since compliance member 40 deflects a small angle relative to first axis, since angular deflections of first, second, third, and fourth canted resilient plates 50 and 52 relative to first axis X are small, and since first disc 12, beam 14, and column 24 are made of rigid material, inner and outer faces 13 and 15 of first disc 12 remain generally parallel to inner and outer faces 32 and 33 of second disc 30 and generally parallel to inner and outer walls 41 and 48 of compliance member 40 during insertion of the object into the workpiece. Rigidity of robot compliance device 10 along first axis X is, thus, significantly increased. The spacing between beam 14 and second disc 30 and the spacing between compliance member 40 and the first disc 12 limit compression of robot compliance device 10 according to the preferred teachings of the present invention along first axis X.

Robot compliance device 10 according to the preferred teachings of the present invention has a simpler structure compared to conventional compliance devices currently utilized in industry. Thus, the costs for manufacturing and assembling robot compliance device 10 according to the preferred teachings of the present invention are low. Furthermore, first, second, third, and fourth canted resilient plates 50 and 52 can be adjusted easily by varying the thickness, length, or the material of construction. Furthermore, first, second, third, and fourth canted resilient plates 50 and 52 can be adjusted easily by varying the first and second acute angles with first axis X. Adjustments in these manners control their spring response so that robot compliance device 10 according to the preferred teachings of the present invention can be easily modified for differing applications without the need for new molding, tooling, etc. Further, the first and second acute angles can be selected according to the distance between the object and the RCC and according to the desired spherical compliance including angular deflections of first, second, third, and fourth canted resilient members 50 and 52 and compliance member 40. However, the first and second acute angles should be selected so that the rigidity along first axis X is still sufficient to meet the work needs. Furthermore, use of first, second, third, and fourth canted resilient plates 50 and 52 dramatically increases the rigidity of robot compliance device 10 according to the preferred teachings of the present invention along first axis X. Thus, robot compliance device 10 according to the preferred teachings of the present invention can be utilized in assembly involving a large insertion force without the need of extra elements for limiting travel of robot compliance device 10 according to the preferred teachings of the present invention along first axis X. Further, the travels of first, second, third, and fourth canted resilient plates 50 and 52 along third axis Z are limited by sidewalls 36 of groove 34. Further, the inner periphery of central hole 46 of compliance member 40 also serves as a travel limiter to limit movement of compliance member 40 relative to column 24 in a plane containing second and third axes Y and Z. Thus, robot compliance device 10 according to the preferred teachings of the present invention is a compact design compared to conventional compliance devices that require extra elements to achieve the travel limiting functions along first, second, and third axes X, Y, and Z. Further, the spacing between beam 14 and second disc 30 and the spacing between compliance member 40 and first disc 12 can be as small as possible so that the overall length of robot compliance device 10 according to the preferred teachings of the present invention along first axis X is short. However, the spacing between beam 14 and second disc 30 and the spacing between compliance member 40 and first disc 12 can be varied according to needs.

Now that the basic teachings of the present invention have been explained, many extensions and variations will be obvious to one having ordinary skill in the art. For example, robot compliance device 10 according to the preferred teachings of the present invention can be mounted in a reverse manner such that second disc 30 is fixed to the arm of the robot and that first disc 12 is coupled with the holding device that securely holds the object to be inserted into the hole of the workpiece. First and second discs 12 and 30 and column 24 can be of other shapes including but not limited to polygonal forms. As an example, one of first and second discs 12 and 30 can have square cross sections while the other of first and second discs 12 and 30 has circular cross sections. Likewise, beam 14 can have other shapes including but not limited to having triangular cross sections. Likewise, groove 34 and beam 14 can be of other shapes without adversely affecting the travel limiting function. If desired, the spacing between column 24 and first canted resilient plate 50 can be different from that between column 24 and second canted resilient plate 50. Likewise, the spacing between column 24 and third canted resilient plate 52 can be different from that between column 24 and fourth canted resilient plate 52. The spacing between each of first and second sidewalls 36 of groove 34 and one of first and second sides 22 of beam 14 received in groove 34 can be varied to adjust the travel limit of beam 14 along third axis Z. Likewise, the spacing between the inner periphery of central hole 46 of compliance member 40 and column 24 can be varied to adjust the travel limit of compliance member 40 in the plane containing second and third axes Y and Z. Further, first and second canted resilient plates 50 can be attached to end faces or other suitable locations of first section 42 of compliance member 40. Further, first and second canted resilient plates 50 can be attached to end faces or other suitable locations of beam 14. Likewise, third and fourth canted resilient plates 52 can be attached to end faces or other suitable locations of second section 44 of compliance member 40. Groove 34 of second disc 30 can be formed in other manners such as by inner face 32 of second disc 30 including protrusions or the like on opposite sides of beam 14 to limit travel of beam 14 along third axis Z.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:
1. A robot compliance device comprising, in combination:
first and second discs spaced from each other along a first axis, with one of the first and second discs being adapted to be fixed to an arm of a robot, with the other of the first and second discs being adapted to couple with an object having an object axis to be inserted into a workpiece having a workpiece axis;
a beam intermediate the first and second discs;
a column interconnected between the first disc and the beam and extending along the first axis;

a compliance member mounted around the column between the first disc and the beam, with the compliance member being moveable relative to the column;

first and second canted resilient plates interconnected between the beam and the compliance member, with each of the first and second canted resilient plates being at a first acute angle with and spaced from the first axis, with the column intermediate the first and second canted resilient plates, with the first and second canted resilient plates spaced from each other along a second axis perpendicular to the first axis; and third and fourth canted resilient plates interconnected between the second disc and the compliance member, with each of the third and fourth canted resilient plates being at a second acute angle with and spaced from the first axis, with the column intermediate the third and fourth canted resilient plates, with the third and fourth canted resilient plates spaced from each other along a third axis perpendicular to the first and second axes, wherein when one of the first and second discs is subjected to a force acting in a direction not coincident to the first axis resulting from misalignment of the object axis and the workpiece axis during insertion of the object into the workpiece, the first and second canted resilient plates deform along the second axis with the compliance member moving along the second axis responsive to the deforming of the first and second canted resilient plates, and the third and fourth canted resilient plates deform along the third axis with the compliance member moving along the third axis responsive to the deforming of the third and fourth canted resilient plates, with the compliance member deflecting relative to the first axis and with the object rotating about an object center of compliance during insertion of the object into the workpiece.

2. The robot compliance device as claimed in claim 1, with the column having first and second ends respectively interconnected to centers of the first disc and the beam, with the first and second resilient plates having increasing spacings therebetween along the second axis toward the compliance member, and with the third and fourth resilient plates having increasing spacings therebetween along the third axis toward the compliance member.

3. The robot compliance device as claimed in claim 2, with the first acute angle equal to the second acute angle, with the increasing spacings between the first and second canted resilient plates having a first spacing increment toward the compliance member along the first axis, with the increasing spacings between the third and fourth canted resilient plates having a second spacing increment toward the compliance member along the first axis, and with the first spacing increment equal to the second spacing increment.

4. The robot compliance device as claimed in claim 3, with the beam extending along the second axis and having first and second ends on opposite sides of the column, with each of the first and second canted resilient plate including first and second ends and inner and outer inclined surfaces extending between the first and second ends thereof, with the inner and outer inclined surfaces of the first canted resilient plate spaced from each other along the second axis, with the inner and outer inclined surfaces of the second canted resilient plate spaced from each other along the second axis, and with the increasing spacings between the first and second canted resilient plates formed between the inner inclined surfaces of the first and second canted resilient plates, with the first end of the first canted resilient plate interconnected to the first end of the beam, with the second end of the first canted resilient plate interconnected to the compliance member, with the first end of the second canted resilient plate interconnected to the second end of the beam, and with the second end of the second canted resilient plate interconnected to the compliance member.

5. The robot compliance device as claimed in claim 4, with the first canted resilient plate having a length between the compliance member and the beam equal to that of the second canted resilient plate between the compliance member and the beam.

6. The robot compliance device as claimed in claim 4, with the first disc including an inner face facing the beam and an outer face parallel to and spaced from the inner face along the first axis, and with the column interconnected to the center of the inner face of the first disc.

7. The robot compliance device as claimed in claim 6, with the second disc including an outer face parallel to and spaced from the outer face of the first disc along the first axis, with the second disc further including an inner face parallel to and spaced from the outer face of the second disc along the first axis, with the third and fourth canted resilient plates interconnected to the inner face of the second disc, with the inner face of the second disc intermediate the outer face of the second disc and the compliance member, and with each of the first and second discs having circular cross sections.

8. The robot compliance device as claimed in claim 7, with the compliance member including an inner wall generally parallel to and spaced from the inner face of the first disc along the first axis in an unstressed condition, with the compliance member further including an outer wall parallel to and spaced from the inner wall of the compliance member along the first axis, and with the outer wall of the compliance member intermediate the inner face of the first disc and the inner wall of the compliance member.

9. The robot compliance device as claimed in claim 8, with the beam including an inner surface facing the inner face of the first disc and extending between the first and second ends of the beam, with the inner surface of the beam generally parallel to and spaced from the inner wall of the compliance member along the first axis in an unstressed condition, with the first canted resilient plate interconnected between the inner surface of the beam and the inner wall of the compliance member, and with the second canted resilient plate interconnected between the inner surface of the beam and the inner wall of the compliance member.

10. The robot compliance device as claimed in claim 3, with each of the third and fourth canted resilient plates including first and second ends and inner and outer inclined surfaces extending between the first and second ends thereof, with the inner and outer inclined surfaces of the third canted resilient plate spaced from each other along the third axis, with the inner and outer inclined surfaces of the fourth canted resilient plate spaced from each other along the third axis, and with the increasing spacings between the third and fourth canted resilient plates formed between the inner inclined surfaces of the third and fourth canted resilient plates, with the first end of the third canted resilient plate interconnected to the second disc, with the second end of the third canted resilient plate interconnected to the compliance member, with the first end of the fourth canted resilient plate interconnected to the second disc, and with the second end of the fourth canted resilient plate interconnected to the compliance member.

11. The robot compliance device as claimed in claim 2, with the second disc including an inner face facing the first disc and a groove in the inner face of the second disc, with the groove extending along the second axis, with the beam moveably received in the groove along the second and third axes, and with the third and fourth canted resilient plates interconnected to the inner face of the second disc on opposite sides of the groove.

12. The robot compliance device as claimed in claim 11, with the third canted resilient plate having a first length between the compliance member and the second disc equal to that of the fourth canted resilient plate between the compliance member and the second disc.

13. The robot compliance device as claimed in claim 12, with the first canted resilient plate having a second length between the compliance member and the beam equal to that of the second canted resilient plate between the compliance member and the beam, and with the first length equal to the second length.

14. The robot compliance device as claimed in claim 11, with the groove including first and second sidewalls spaced from each other along the third axis, with the beam including parallel, first and second sides spaced from each other along the third axis, with the first side of the beam generally parallel to and spaced from the first sidewall of the groove along the third axis in an unstressed condition, with the second side of the beam generally parallel to and spaced from the second sidewall of the groove along the third axis in the unstressed condition, and with the first and second sidewalls of the groove limiting movement of the beam in the groove along the third axis.

15. The robot compliance device as claimed in claim 14, with the groove further including a bottom wall interconnected between the first and second sidewalls, with the beam having an outer surface facing away from the first disc, and with the outer surface of the beam generally parallel to and spaced from the bottom wall of the groove along the first axis in the unstressed condition.

16. The robot compliance device as claimed in claim 15, with the second disc further including an outer face parallel to and spaced from the inner face of the second disc along the first axis, and with the inner face of the second disc intermediate the outer face of the second disc and the compliance member.

17. The robot compliance device as claimed in claim 1, with the compliance member being cross-shaped and including a first section extending along the second axis and a second section extending along the third axis and intersecting the first section at a compliance center of the compliance member, with the first section including two ends on opposite sides of the compliance center and interconnected to the first and second canted resilient plates, with the second section including two ends on opposite sides of the compliance center and interconnected to the third and fourth canted resilient plates, with the compliance member including a central hole in the compliance center, and with the column extending through the central hole and spaced from an inner periphery of the central hole in an unstressed condition.

18. The robot compliance device as claimed in claim 17, with the inner periphery of the central hole having circular cross sections, with the column including two ends respectively interconnected to the beam and the first disc, with the column having circular cross sections between the two ends, with the column including a longitudinal axis coincident to the first axis, and with the column further including an outer periphery having an identical spacing to the circular inner periphery of the central hole in a circumferential direction surrounding the first axis in the unstressed condition.

19. The robot compliance device as claimed in claim 18, with the first section including a first constant length along the second axis, with the second section including a second constant length along the third axis, with the first constant length equal to the second constant length, with the first section including a first constant width along the third axis, with the second section including a second constant width along the second axis, with the first constant width equal to the second constant width, with the first section including a first constant thickness along the first axis, with the second section including a second constant thickness along the first axis, and with the first constant thickness equal to the second constant thickness.

20. The robot compliance device as claimed in claim 1, with the first, second, third, and fourth canted resilient plates having a geometric center on the first axis, with the compliance member moving along the second and third axes about a compliance center, and with the object center of compliance intermediate the geometric center of the first, second, third, and fourth canted resilient plates and the compliance center of the compliance member along the first axis.

\* \* \* \* \*

UNITED STATES PATENT AND TRADEMARK OFFICE
CERTIFICATE OF CORRECTION

| | | |
|---|---|---|
| PATENT NO. | : 8,443,526 B2 | Page 1 of 1 |
| APPLICATION NO. | : 12/613401 | |
| DATED | : May 21, 2013 | |
| INVENTOR(S) | : Kevin B. Weiss | |

It is certified that error appears in the above-identified patent and that said Letters Patent is hereby corrected as shown below:

Title page, item (73), in Assignee city name, delete "Vadnasi" and substitute therefore --Vadnais--.

Signed and Sealed this
Twenty-third Day of July, 2013

Teresa Stanek Rea
*Acting Director of the United States Patent and Trademark Office*